US009357099B2

(12) United States Patent
Honda

(10) Patent No.: US 9,357,099 B2
(45) Date of Patent: May 31, 2016

(54) IMAGE PROCESSING APPARATUS AND IMAGE PROCESSING METHOD FOR APPROPRIATELY PROCESSING AND UNNECESSARY TEXT AREA OR IMAGE AREA

(71) Applicant: KYOCERA Document Solutions Inc., Osaka-shi, Osaka (JP)

(72) Inventor: Toru Honda, Osaka (JP)

(73) Assignee: Kyocera Document Solutions Inc. (JP)

( * ) Notice: Subject to any disclaimer, the term of this patent is extended or adjusted under 35 U.S.C. 154(b) by 6 days.

(21) Appl. No.: 14/667,774

(22) Filed: Mar. 25, 2015

(65) Prior Publication Data
US 2015/0281515 A1 Oct. 1, 2015

(30) Foreign Application Priority Data

Mar. 28, 2014 (JP) .................. 2014-067845

(51) Int. Cl.
G06K 15/02 (2006.01)
H04N 1/393 (2006.01)
H04N 1/387 (2006.01)
G09B 3/08 (2006.01)
G09B 7/02 (2006.01)

(52) U.S. Cl.
CPC .............. *H04N 1/393* (2013.01); *H04N 1/3873* (2013.01); *G09B 3/085* (2013.01); *G09B 7/02* (2013.01); *H04N 1/3876* (2013.01); *H04N 2201/0093* (2013.01)

(58) Field of Classification Search
None
See application file for complete search history.

(56) References Cited

U.S. PATENT DOCUMENTS

| 5,532,839 | A | * | 7/1996 | Beikirch | H04N 1/00572 271/209 |
| 7,085,012 | B2 | * | 8/2006 | Schweid | G06K 9/32 358/2.1 |
| 8,605,321 | B2 | * | 12/2013 | Nakai | H04N 1/00846 358/1.13 |
| 2006/0215911 | A1 | * | 9/2006 | Ashikaga | G06F 17/30011 382/190 |
| 2006/0290999 | A1 | * | 12/2006 | Ebitani | G09B 7/02 358/426.06 |
| 2007/0094251 | A1 | * | 4/2007 | Lu | G06F 17/30056 |
| 2008/0187234 | A1 | * | 8/2008 | Watanabe | H04N 1/3876 382/254 |
| 2011/0063682 | A1 | * | 3/2011 | Kanamoto | G06K 15/1809 358/1.18 |
| 2015/0055151 | A1 | * | 2/2015 | Inomata | G06K 9/00456 358/1.9 |

FOREIGN PATENT DOCUMENTS

JP 2009-17041 1/2009

* cited by examiner

*Primary Examiner* — Miya J Cato
(74) *Attorney, Agent, or Firm* — Gerald Hespos; Michael Porco; Matthew Hespos

(57) ABSTRACT

Provided is an image processing apparatus including an area determination unit, an area processing unit and an area adjustment unit. Upon acquiring multiple image data, the area determination unit is configured to determine whether a text area or an image area of one image data matches an initial text area or an initial image area that has initially appeared in another image data. When the text area or image area of the image data matches the initial text area or initial image area as a result of the determination, the area processing unit is configured to execute processing of reducing the image data of the matching text area or image area. The area adjustment unit is configured to generate image data which is a composite of the data-reduced area resulting from the processing, and a mismatched text area or image area.

7 Claims, 7 Drawing Sheets

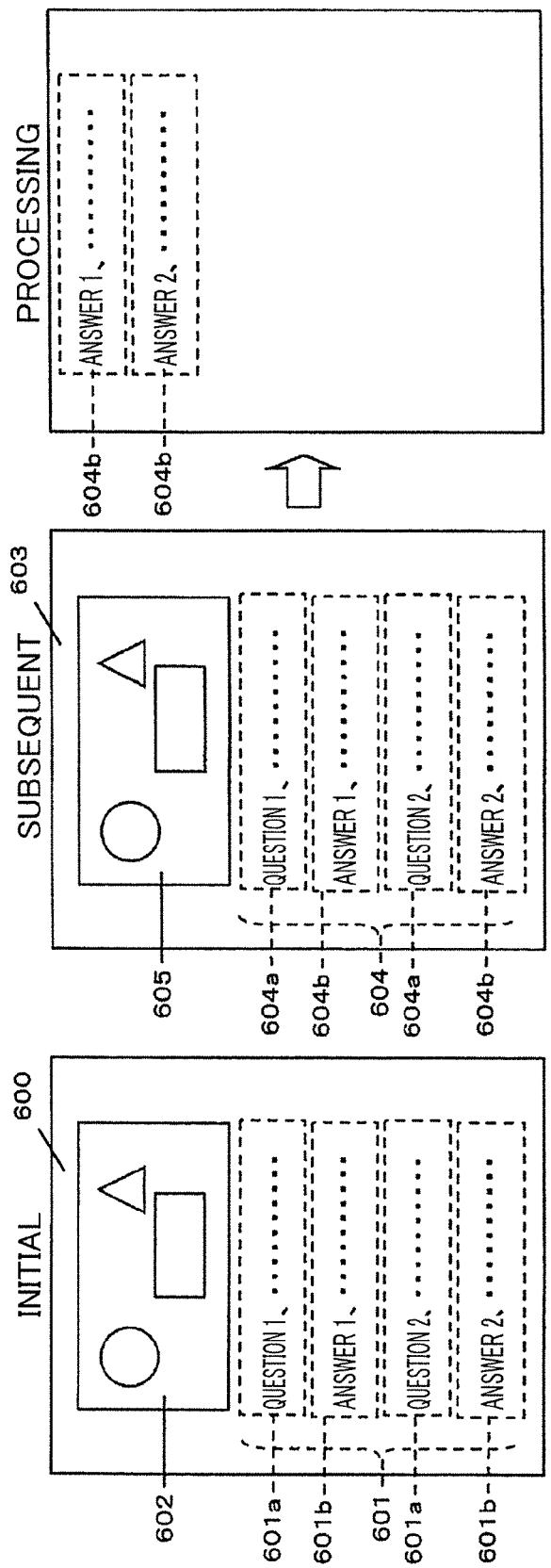

IMAGE PROCESSING APPARATUS AND IMAGE PROCESSING METHOD FOR APPROPRIATELY PROCESSING AND UNNECESSARY TEXT AREA OR IMAGE AREA

INCORPORATION BY REFERENCE

This application relates to and claims priority from Japanese Patent Application No. 2014-067845, filed on Mar. 28, 2014 with the Japan Patent Office, the entire disclosure of which is incorporated herein by reference.

TECHNICAL FIELD

The present disclosure relates to an image processing apparatus and an image processing method, and specifically relates to an image processing apparatus and an image processing method capable of appropriately processing an unnecessary text area or image area.

BACKGROUND ART

In recent years, numerous technologies of image processing apparatuses that process image data in accordance with the user's request have been developed. For example, there is a multifunction peripheral which reads a paper document in which the location to be edited on is marked in advance, digitizes the document with a reading control unit, and identifies the text string of the marked location from the results of the text string information identified with an OCR control unit and position/range information of the mark detected with a mark identification unit. This multifunction peripheral digitizes the replacement-designated document on which the substitute text string is written with a reading control unit, stores the result in a memory, and identifies the text string to be replaced from the digitized image by using the OCR control unit. Furthermore, the multifunction peripheral replaces the marked text string with the substitute text string while simultaneously correcting the layout so that it will become the user's intended layout by using a reconfiguration control unit. By so doing, it is possible to simultaneously replace the marked text string and the substitute text string and correct the layout of the overall document image, and the user can obtain the intended image irrespective of the wording of the substitute document.

SUMMARY OF INVENTION

The image processing apparatus according to one aspect of the present disclosure includes an area determination unit, an area processing unit and an area adjustment unit. Upon acquiring multiple image data, the area determination unit is configured to determine whether a text area or an image area of one image data matches an initial text area or an initial image area that has initially appeared in another image data. When the text area or image area of the image data matches the initial text area or initial image area as a result of the determination, the area processing unit is configured to execute processing of reducing the image data of the matching text area or image area. The area adjustment unit is configured to generate image data which is a composite of the data-reduced area resulting from the processing, and a mismatched text area or image area.

The image processing method according to one aspect of the present disclosure includes: determining, upon acquiring multiple image data, whether a text area or an image area of one image data matches an initial text area or an initial image area that has initially appeared in another image data; executing, when the text area or image area of the image data matches the initial text area or initial image area as a result of the determination, processing of reducing the image data of the matching text area or image area; and generating image data which is a composite of the data-reduced area resulting from the processing, and a mismatched text area or image area.

BRIEF DESCRIPTION OF DRAWINGS

FIG. 6A is a diagram showing an example of executing deletion processing to the text area or the image area of the subsequent image data.

DESCRIPTION OF EMBODIMENTS

Embodiments of the image processing apparatus of the present disclosure are now explained with reference to the appended drawings. Note that the following embodiments are examples that embody the present disclosure, and are not intended to limit the technical scope of the present disclosure. Moreover, the alphabet S provided before the numbers in the flowcharts is the abbreviation for "step".

Figure 1:
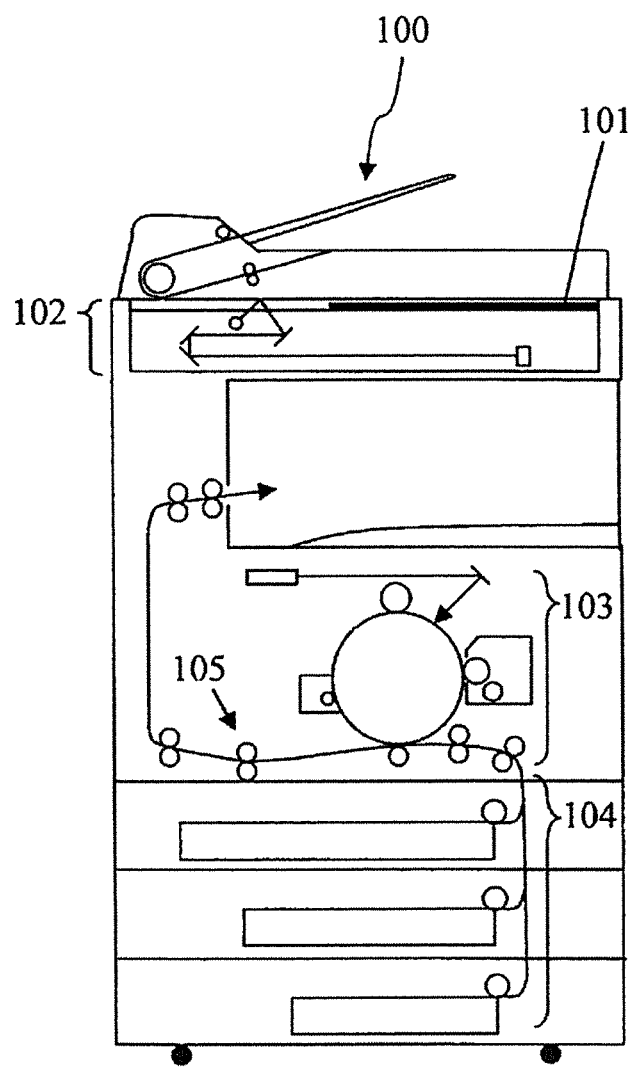
FIG. 1 is a schematic diagram of the multifunction peripheral according to an embodiment of the present disclosure.

FIG. 1 is a schematic diagram of the image processing apparatus according to an embodiment of the present disclosure. However, the detailed explanation of components that are not directly related to this embodiment is omitted. Note that the image processing apparatus of this embodiment is a multifunction peripheral (MFP) 100 including the functions of a copier, a scanner, a printer and so on.

When the user is to use the multifunction peripheral 100, the user places a document on a platen, inputs one's intended setting condition from an operation unit 101 (operation panel), and presses a start key to cause the multifunction peripheral 100 to execute a print job.

The multifunction peripheral 100 includes an image reading device 102, an image forming unit 103, a feeding unit 104, and a fixing unit 105, and executes the print job by driving the respective components in conjunction. The image reading device 102 reads the image data of a document, and processes the image data based on the setting condition. The image forming unit 103 uses, for example, a charger, an exposure unit and a developing unit to form, on a photoreceptor drum, a toner image corresponding to the image data, and uses a transferring unit to transfer the toner image to a recording medium (for instance, a sheet) that is fed. The feeding unit 104 feeds a sheet corresponding to the print job from a paper feeding cassette. The fixing unit 105 fixes the toner image on the sheet. The multifunction peripheral 100 thereby discharges the sheet with the toner image fixed thereon as printed matter and executes the print job.

Figure 2:
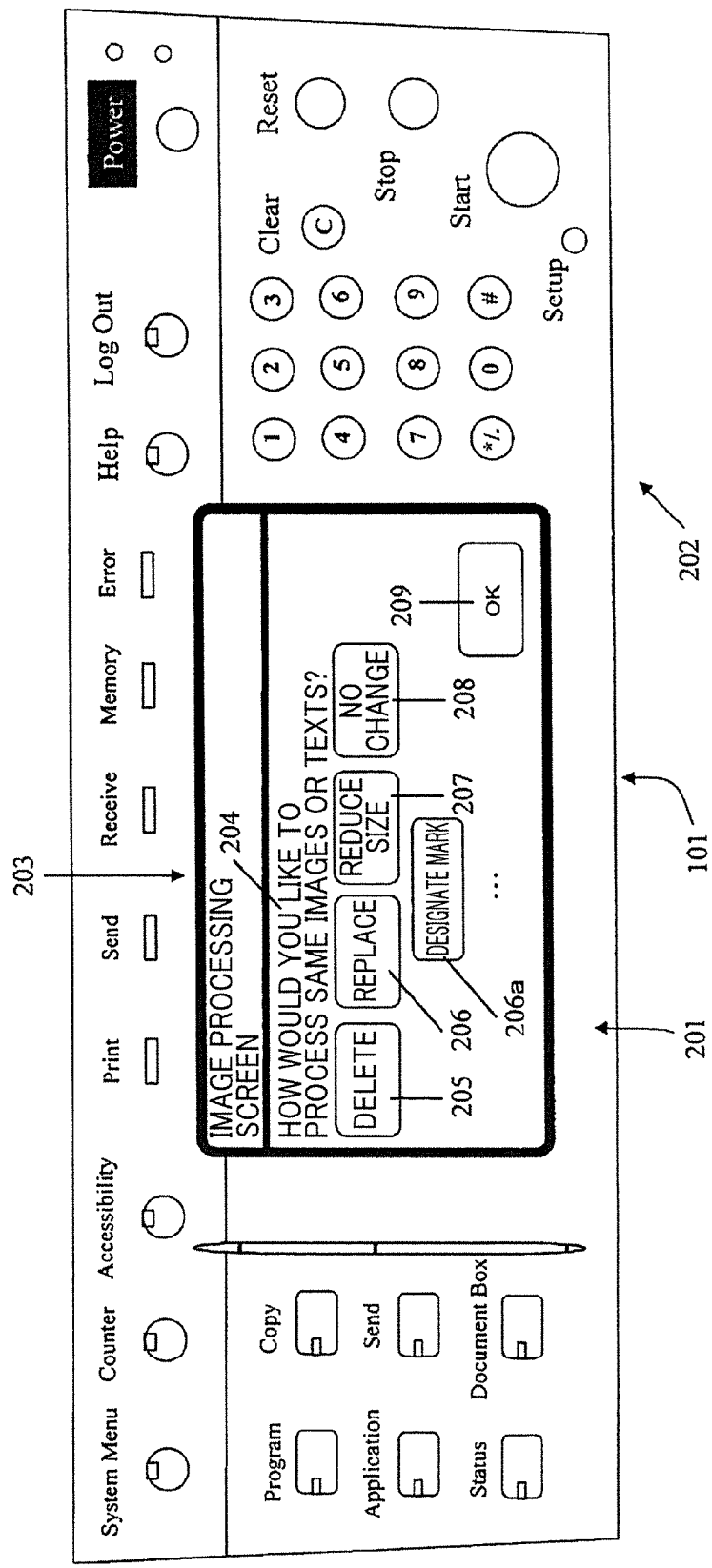
FIG. 2 is a conceptual diagram showing the overall configuration of the operation unit according to an embodiment of the present disclosure.

Next, FIG. 2 is a conceptual diagram showing the overall configuration of the operation unit 101 according to this embodiment. The user uses the operation unit 101 to confirm a predetermined operation screen or input predetermined information. The operation unit 101 is provided with a touch panel 201 (operation panel), and an operation key 202.

The touch panel 201 is used for displaying a predetermined screen or, by the user pressing a key on the displayed screen, inputting information corresponding to the pressed key. As the operation key 202, provided are, for example, a numeric key, a start key, a clear key, a stop key, a reset key, a power key and so on.

Figure 3:
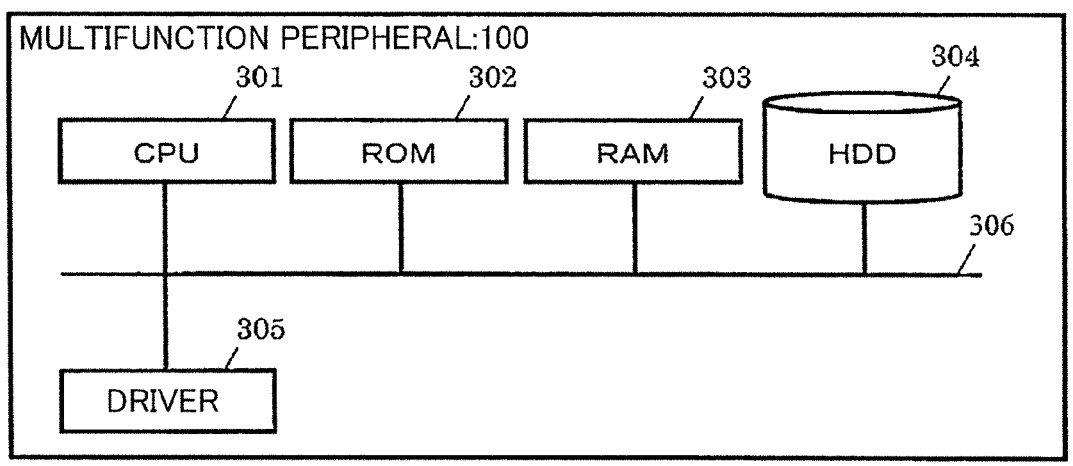
FIG. 3 is a block diagram showing the hardware configuration of the control system of the multifunction peripheral.

The hardware configuration of the control system of the multifunction peripheral 100 is now explained with reference to FIG. 3. FIG. 3 is a block diagram showing the hardware configuration of the control system of the multifunction peripheral 100. However, the detailed explanation of the respective components that are not directly related to the present disclosure is omitted.

A control circuit of the multifunction peripheral 100 includes a CPU (Central Processing Unit) 301, a ROM (Read Only Memory) 302, a RAM (Random Access Memory) 303, an HDD (Hard Disk Drive) 304, and a driver 305 corresponding to each drive unit, which are connected via an internal bus 306.

The CPU 301 uses, for example, the RAM 303 as a work area to execute the programs stored in the ROM 302, the HDD 304 and the like, receives data and instructions, signals, commands and the like from the driver 305 based on the execution result, and thereby controls the operation of the respective drive units shown in FIG. 1.

Moreover, with regard to the respective components (shown in FIG. 4) described later other than the drive unit, the CPU also realizes the operation of the respective components by executing the respective programs. The ROM, the RAM, the HDD and the like store programs and data for realizing the operation of the respective components described below.

Figure 4:
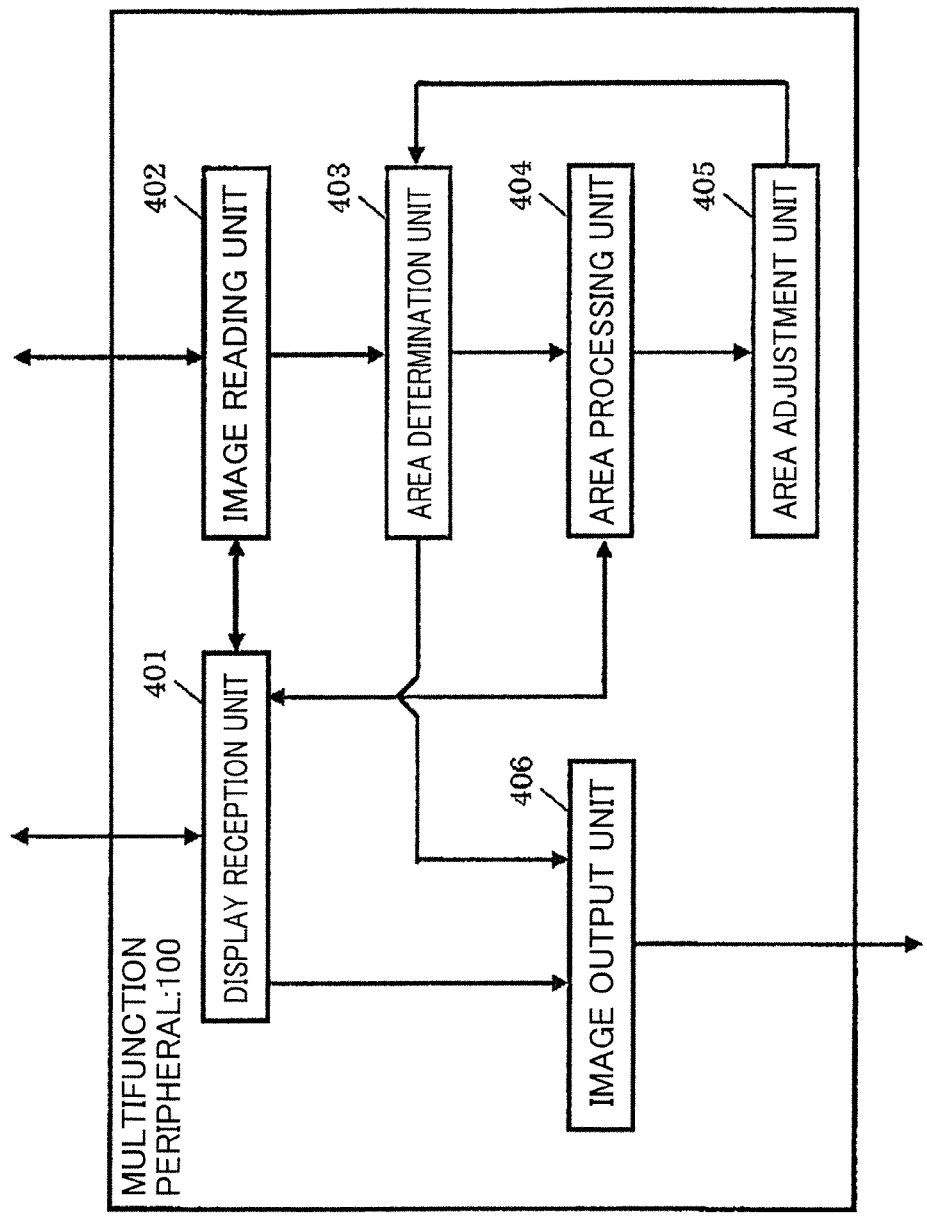
FIG. 4 is a functional block diagram of the multifunction peripheral.
Figure 5:
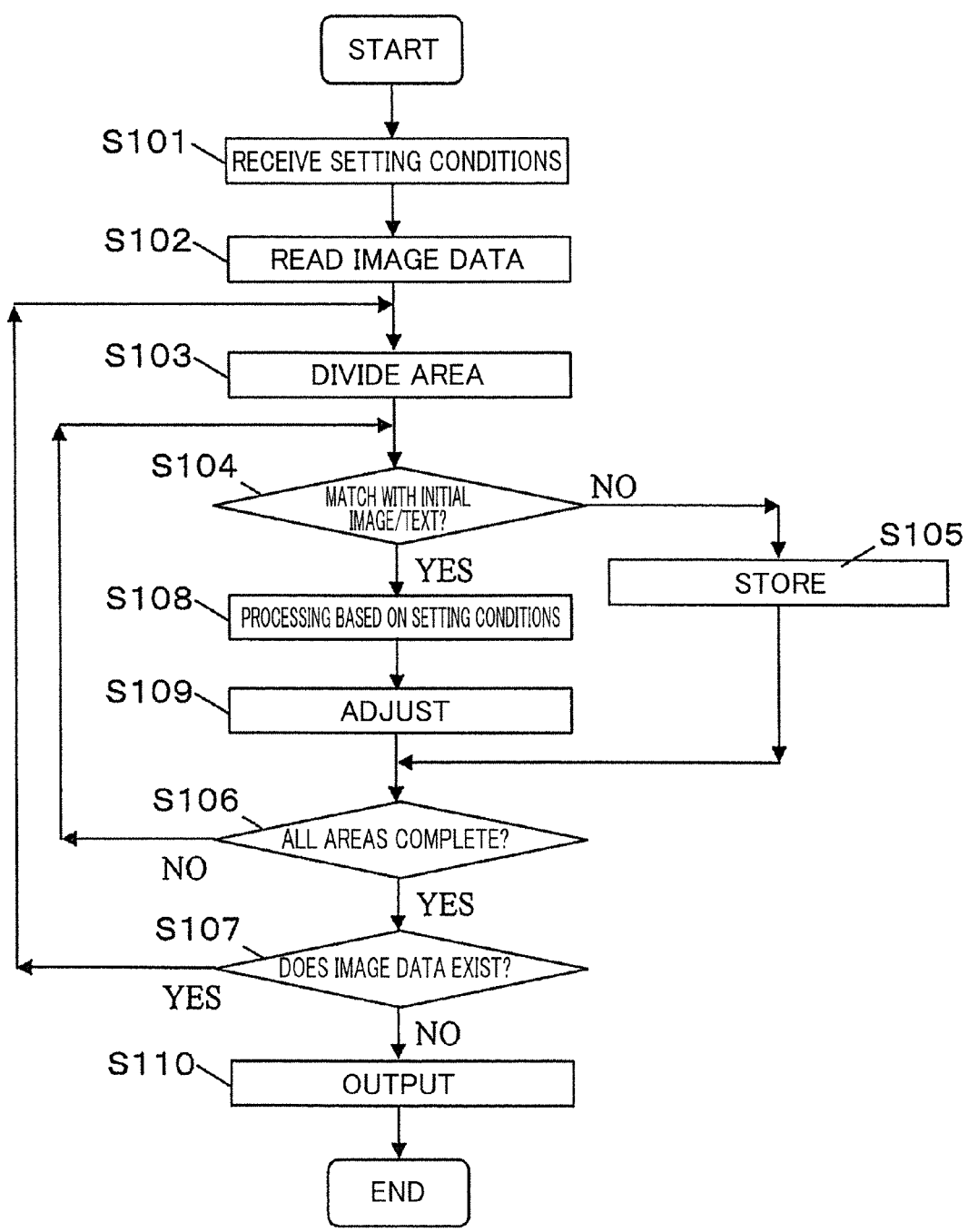
FIG. 5 is a flowchart showing the execution procedure of the image processing method according to an embodiment of the present disclosure.

The configuration and execution procedure according to this embodiment are now explained. FIG. 4 is a functional block diagram of the multifunction peripheral 100 and the operation unit 101. Moreover, FIG. 5 is a flowchart showing the execution procedure of the image processing method according to the present disclosure.

With reference to FIG. 4, the multifunction peripheral 100 includes, as the configuration for performing image processing, a display reception unit 401, an image reading unit 402, an area determination unit 403, an area processing unit 404, an area adjustment unit 405 and an image output unit 406.

The display reception unit 401 receives various types of operation information sent from the user to the multifunction peripheral 100 via the touch panel 201 of the operation unit 101. Moreover, the display reception unit 401 displays various operation screens on the touch panel 201. This operation screen includes the image processing screen 203 shown in FIG. 2.

The image reading unit 402 causes the image reading device 102 illustrated in FIG. 1 to optically read the document having the image which will be subsequently copied as an image by the multifunction peripheral 100, and thereby generates the image data of the document. When the image reading unit 402 causes the image reading device 102 to read a plurality of documents, the image reading unit 402 will generate a plurality of image data.

When the image reading unit 402 acquires a plurality of image data, the area determination unit 403 determines whether a text area or an image area of one image data matches an initial text area or an initial image area that has initially appeared in another image data.

When the text area or image area of the image data matches the initial text area or initial image area as a result of the determination, the area processing unit 404 executes processing (data reduction processing) of reducing the image data of the matching text area or image area (hereinafter collectively referred to as the "matching area"). As this data reduction processing, adopted may be processing of generating a blank area with respect to the matching area, or processing of replacing the image data of the matching area with the image data of a predetermined mark. As a result of converting a part or all of the matching area into a blank area, a blank area of the image data will be formed and, therefore, the data volume of the image data can be reduced. Moreover, by replacing the matching area with a simple mark, for instance, image data of one or several texts or symbols, characters or the like, the data volume can be reduced.

As a specific example of generating a blank area, considered may be processing of generating the blank area by deleting the matching area, or processing of generating the blank area by reducing a size of the matching area. In the former case, the matching area is completely replaced with a blank area, and in the latter case, a blank area is formed in a size resulting after reducing the matching area from the original image size. According to the processing of replacing the matching area to the image data of a predetermined mark, since the data of numerous texts or images included in the matching area is replaced with the data of a simple mark, in the case of a text area, most of the text area that was occupied by images will become a blank area of the image data.

The area adjustment unit 405 generates image data which is a composite of the data-reduced area resulting from the processing, and a mismatched text area or image area (mismatch). In other words, the area adjustment unit 405 performs, to the one image data, processing of generating one new image data by using the data-reduced area that was replaced by the area processing unit 404 with respect to the matching area and using the mismatched area as relative to the other image data.

When the area processing unit 404 executes the processing for generating a blank area, the area adjustment unit 405 generates the new image data by filling in the blank area resulting from the foregoing processing. In the processing of deleting the matching area, the data-reduced area is completely deleted and only the mismatched area is caused to remain, and a composition of disposing the image data of the mismatched area in the blank area is executed. In the processing of reducing the matching area, a composition of disposing the image data of the mismatched area in the blank area resulting from the reduction is executed.

Moreover, when the area processing unit 404 executes the processing for replacing the matching area with the image data of a predetermined mark, the area adjustment unit 405 generates the new image data by combining the area replaced with the predetermined mark resulting from the processing, and the mismatched area. For example, one new image data is generated with respect to the matching area by replacing the matching area with one or several texts or symbols, and by using the mismatched area as is with respect to the mismatched area. Note that the composition may also be performed by disposing the image data of the mismatched area in the blank area resulting from the replacement with a predetermined mark.

The image output unit 406 operates the image forming unit 103, the feeding unit 104 and the fixing unit 105 equipped in the multifunction peripheral 100 and thereby performs processing of forming, on a sheet, an image of the image data generated by the area adjustment unit 405.

In recent years, opportunities are increasing for processing, as image data, handouts of meetings and presentations and documents to be collected such as questionnaires. With these handouts and questionnaires, there are numerous text areas and image areas that use the same (common) expressions, and if these are output directly as image data, there is a problem in that unnecessary text areas and image areas will increase. For example, when printing handouts and questionnaires that consist of multiple pages, printed matter in which the same text area or image area appears multiple times will be output in a large quantity, and consequently there is a problem in that the amount of printed matter that is printed will increase. According to the multifunction peripheral 100 having the foregoing configuration, it is possible to appropriately process the unnecessary text area or image area.

An example of the image processing that is executed by the multifunction peripheral 100 is now explained based on the flowchart shown in FIG. 5. Foremost, the user carries a plurality of documents (for example, handouts or questionnaires) to the multifunction peripheral 100, places the documents on a platen or an automatic document feeder, and activates the multifunction peripheral 100. Consequently, the display reception unit 401 of the multifunction peripheral 100 displays an operation screen on the touch panel 201 of the operation unit 101.

Selectively displayed on the operation screen are an image processing item key relating to the image processing, and a print setting item key relating to the print job. The user selects the key while viewing the operation screen. When the image processing item key is selected, the display reception unit 401 receives the selection of the image processing item key and, as shown in FIG. 2, displays the image processing screen 203 on the touch panel 200.

The image processing screen 203 displays a message part 204 configured to display the message of "How would you like to process same images or texts?" relating to the image processing, a deletion key 205 configured to delete the same images or texts (matching area), a replacement key 206 configured to replace the same images or texts with a predetermined mark, a reduction key 207 configured to reduce the same images or texts, a no-change key 208 configured to leave the same images or texts as is, and an OK key 209. Note that a mark designation key 206a configured to designate the mark to be used as the replacement is displayed near the replacement key 206.

The user considers the contents of the document while viewing the image processing screen 203 and, for example, selects the deletion key 205, and then selects the OK key 209. In the foregoing case, the display reception unit 401 receives the deletion corresponding to the deletion key 205 as the processing setting condition relating to the image processing, and re-displays the operation screen.

Moreover, the user operates the print setting item key related to the print job, inputs the intended print setting condition (paper size, black and white/color, and so on), and then selects the start key. Subsequently, the display reception unit 401 receives the processing setting condition and the print setting condition as a print job (FIG. 5: S101), and notifies such effect to the image reading unit 402. The image reading unit 402 that received the foregoing notification reads the image data of the document (FIG. 5: S102).

Here, there is no particularly limitation in the method of the image reading unit 402 reading the image data of the document. For example, when the image data of the document is to be read from a platen, the user is urged, via a predetermined screen, to place the document on the platen one sheet at a time, and the image reading device 102 is driven to read the image data of the document. Moreover, when the image data of the document is to be read from an automatic document feeder, the automatic document feeder is driven, and the document is fed one sheet at a time, and the image reading device 102 is correspondingly driven to read the image data of the document.

When the image reading unit 402 finishes reading the image data of the document, the image reading unit 402 notifies such effect to the area determination unit 403. Here, let it be assumed that the image data of a plurality of documents was read. The area determination unit 403 that received the foregoing notification determines whether the text area or image area of one image data (subsequent image data) matches the initial text area or initial image area that has initially appeared in another image data (previous image data).

While there is no particular limitation in the method that the area determination unit 403 may perform the foregoing determination, the determination may be performed, for example, as follows. Foremost, the area determination unit 403, as shown in FIG. 6A, divides the read image data 600 into a text area 601 that is configured only from texts and an image area 602 that is configured only from images other than texts (FIG. 5: S103). Subsequently, the area determination unit 403 refers to a predetermined memory, and determines whether the divided text area 601 or image area 602 matches the initial text area or initial image area that has initially appeared (FIG. 5: S104).

Here, the divided text area 601 or image area 602 is included in the image data of the initial document, and the initial text area or initial image area is not stored in the memory. Thus, in S104, the area determination unit 403 determines that the divided text area 601 or image area 602 does not match the initial text area or initial image area (FIG. 5: S104 NO). Subsequently, the area determination unit 403 stores the divided text area 601 or image area 602 in the memory as the initial text area or initial image area (FIG. 5: S105). It is thereby possible to form a database of the initial text area or initial image area.

After storing the initial text area or initial image area in the memory, the area determination unit 403 determines whether the determination processing has been performed for all areas of the image data (FIG. 5: S106). In the foregoing case, since the image data is the image data of the initial document, the text area 601 and the image area 602 of this image data are all determined to be the initial text area or initial image area, and stored in the memory.

Subsequently, in S106, when the determination processing has been performed for all areas of the image data (FIG. 5: S106 YES), the area determination unit 403 determines whether there is image data that should be subsequently processed (determined) (FIG. 5: S107).

At this point in time, since only the initial image data has been processed and there are multiple image data corresponding to the document, in S107, as a result of the foregoing determination, the area determination unit 403 determines that there is image data that should be processed (FIG. 5: S107 YES). The processing returns to S103, and the area determination unit 403, as shown in FIG. 6A, divides the (unprocessed) subsequent image data 603 into a text area 604 and an image area 605 (FIG. 5: S103).

Subsequently, the area determination unit 403 once again determines whether the divided text area 604 or the image area 605 matches the initial text area 601 or the initial image area 602 (FIG. 5: S104).

Since the initial text area 601 or the initial image area 602 is stored in the memory, the area determination unit 403 foremost compares the divided text area 604 with the initial text area 601 and determines whether the two match. For example, the area determination unit 403 performs optical character recognition (OCR) to the respective text areas, and thereby determines whether the two match.

As shown in FIG. 6A, let it be assumed that the initial image data 600 is the questionnaire form of a first person and the subsequent image data 603 is the questionnaire form of a second person. In the foregoing case, of the divided text area 604, the text area 604a relating to the question matches the initial text area 601a relating to the question of the initial text area 601.

When the area determination unit 403 determines that the text area 604a relating to the divided text area 604 matches the initial text area 601a relating to the question of the initial text area 601 (FIG. 5: S104 YES), the area determination unit 403 notifies such effect to the area processing unit 404. The area processing unit 404 that received the foregoing notification executes processing of reducing image data to the matching text area 601a; that is, processing of either deleting the text area 601a, replacing the text area 601a with a predetermined mark, or reducing the text area 601a in accordance with the processing setting condition that was input (FIG. 5: S108).

While there is no particular limitation in the method that the area processing unit 404 executes the processing, the processing is executed, for example, as follows. Foremost, when the processing setting condition is deletion (when the deletion key 205 is pressed on the image processing screen 203), as shown in FIG. 6A, the area processing unit 404 deletes the text area 604a relating to the question within the matching text area. The unnecessary text area can thereby be deleted.

When the area processing unit 404 completes the processing, the area processing unit 404 notifies such effect to the area adjustment unit 405. The area adjustment unit 405 that received the foregoing notification fills the blank area resulting from the processing, and thereby adjusts the image data of the mismatched text area 604b (FIG. 5: S109).

There is no particular limitation in the method that the area adjustment unit 405 makes the adjustment. When the matching text area 604a is deleted, a corresponding blank area is generated. Thus, the area adjustment unit 405 fills the blank area as though the blank area never existed in the subsequent image data 603. The unnecessary blank area will thereby be eliminated.

Meanwhile, of the divided text area 604, the text area 604b relating to the answer does not match the initial text area 601b relating to the answer of the initial text area 601. In the foregoing case (FIG. 5: S104 NO), the area determination unit 403 leaves the text area 604b relating to the answer within the mismatched text area as is, and additionally stores the text area 604b as the initial text area in the memory (FIG. 5: S105). Consequently, the text area that initially appears in the initial image data 600 and the subsequent image data 603 will be accumulated in the database as needed.

When the area determination unit 403 completes the determination regarding the divided text area 604, the processing returns from S106 to S104. Subsequently, the area determination unit 403 compares the divided image area 605 with the initial image area 602, and determines whether the two match. For example, the area determination unit 403 determines whether the two match or whether the two are similar figures (approximate forms) by pattern-matching the respective image areas.

Here, as shown in FIG. 6A, since the questionnaire form of the first person and the questionnaire form of the second person basically contain common images, the divided image area 605 matches the initial image area 602.

In the foregoing case, the area determination unit 403 determines that the divided image area 605 matches the initial image area 602 (FIG. 5: S104 YES). Subsequently, in the same manner described above, the area processing unit 404 deletes the matching image area 605 (FIG. 5: S108). Furthermore, the area adjustment unit 405 fills the blank area resulting from the processing (FIG. 5: S109). Consequently, as shown with the image of "processing" on the right side of FIG. 6A, ultimately, only the text area 604b relating to the answer that differs from the initial image data 600 will remain in the subsequent image data 603. This image data will be image data that reflects only useful information compared with the initial image data 600.

In S106, when the determination processing of all areas of the subsequent image data 603 is completed (FIG. 5: S106 YES), the area determination unit 403 determines, in the same manner described above, whether there is image data that should be subsequently processed (FIG. 5: S107).

When there are a plurality of image data as described above, determination by the area determination unit 403, processing by the area processing unit 404, and adjustment by the area adjustment unit 405 are repeated. Consequently, for example, even when the document is a voluminous questionnaire form, since only information (useful information) that does not appear initially remains as image data, it is possible to eliminate waste.

Figure 6B:
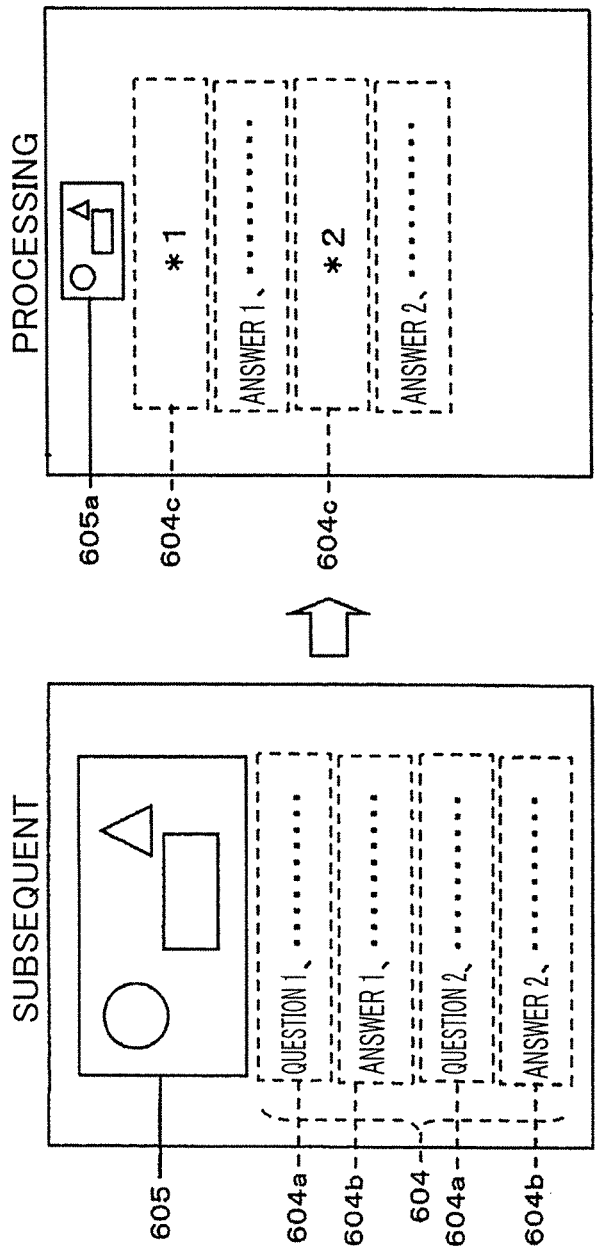
FIG. 6B is a diagram showing an example of executing replacement or reduction processing to the text area or the image area of the subsequent image data.

In S108, let it be assumed that the processing setting condition is the replacement with a predetermined mark (the replacement key 206 and the mark designation key 206a are designated on the image processing screen 203). In the foregoing case, as shown in FIG. 6B, the area processing unit 404 replaces the text area 604a relating to the question as the matching text area with a mark 604c (for example, "*") that is designated in advance by the user. Here, in correspondence to a rank suffix (for example, "1" of question 1) that is assigned to the text area 604a in advance, a rank suffix ("1") is also assigned to the mark 604c ("*"). It is thereby possible to considerably reduce the unnecessary text area 604a while keeping a certain level of comprehensibility.

Moreover, when the processing setting condition is reduction (when the reduction key 207 is selected on the image processing screen 203), as shown in FIG. 6B, the area processing unit 404 reduces the size of the matching image area 605 based on a reduction ratio that is designated in advance, and leaves the reduced image area 605a as the image data. Here, the initial image area 605 is reduced in size at a reduction ratio of roughly ⅓. Since the reduced ⅔ will become a blank area, the blank area is filled in the image of "processing". It is thereby possible to considerably reduce the unnecessary image area 605 while keeping a certain level of comprehensibility.

In S107, when there is no more image data to be processed (FIG. 5: S107 NO), the area determination unit 403 notifies such effect to the image output unit 406. The image output unit 406 that received the foregoing notification outputs the adjusted image data in correspondence with the print setting condition (FIG. 5: S110).

In the foregoing explanation, the image output unit 406 forms an image in correspondence with the print setting condition, and discharges printed matter. Here, as described above, since the unnecessary text area 604 or image area 605 has already been processed, it is possible to prevent the printed matter from becoming voluminous, and it is also possible to reduce the paper consumption and toner consumption.

Note that the output of the image output unit 406 is not limited to a print job. For example, the image output unit 406 may also output the adjusted image data by storing it as a predetermined file or sending it to a specified destination via facsimile or email.

When all output is completed, the image output unit 406 notifies the area determination unit 403 to such effect. The area determination unit 403 that received the foregoing notification erases the initial text areas 601 or initial image areas 602 accumulated as the database. All processing is thereby completed.

As described above, according to this embodiment, provided are an area determination unit 403 configured to determine, when a plurality of image data are read, whether a text area or an image area of one image data matches an initial text area or an initial image area that has initially appeared in another image data, an area processing unit 404 configured to execute, when the text area or image area of the image data matches the initial text area or initial image area as a result of the determination, processing of reducing the image data of the matching text area or image area; for instance, processing of either deleting the matching area, replacing the matching area with a predetermined mark, or reducing the matching area, and an area adjustment unit 405 configured to adjust the image data of the mismatched text area or image area by filling the blank area resulting from the processing. It is thereby possible to appropriately process the unnecessary text area or image area.

Note that, in this embodiment, while the multifunction peripheral 100 was anticipated as the image processing apparatus, the present disclosure may also be applied to a scanner configured to read image data, a facsimile configured to send image data, or the like.

Moreover, in this embodiment, the multifunction peripheral 100 was configured to include the respective components, but the configuration may also be realized by storing programs for realizing the respective components in a storage medium, and providing the storage medium. With this configuration, the programs are read by the multifunction peripheral 100, and the multifunction peripheral 100 realizes the respective components. In the foregoing case, the programs read from the recording medium yield the operation and effect of the present disclosure. In addition, the present invention may also be provided as a method of storing the steps that are executed by the respective components in a hard disk.

As described above, the image processing apparatus and the image processing method according to the present disclosure are useful in an image processing apparatus such as a copier, a printer, a scanner, or a facsimile in addition to a multifunction peripheral as described above, and effective as an image processing apparatus and an image processing method capable of appropriately processing the unnecessary text area or image area.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image processing apparatus, comprising:
    an image reading section configured to read a document and to generate an image data, and
    a processing unit configured to perform image processing to the image data, wherein the processing unit includes:
        an area determination unit configured to determine, upon acquiring a first image data for a first document and a second image data for a second document, whether a text area or an image area of the second image data matches an initial text area or an initial image area that has initially appeared in the first image data;
        an area processing unit configured to execute, when the text area or image area of the second image data matches the initial text area or initial image area as a result of the determination, processing of reducing the image data of the matching text area or image area about the second image data; and
        an area adjustment unit configured to generate one new image data corresponding to the second document by using the data-reduced area resulting from the processing, and using a mismatched text area or image area.

2. The image processing apparatus according to claim 1, wherein
    the processing that is executed by the area processing unit is processing of generating a blank area with respect to the matching text area or image area, and
    the area adjustment unit configured to generate the one new image data which is the composite obtained by filling the blank area resulting from the processing.

3. The image processing apparatus according to claim 2, wherein
    the area processing unit configured to generate the blank area by deleting the matching text area or image area.

4. The image processing apparatus according to claim 2, wherein
    the area processing unit generates the blank area by reducing a size of the matching text area or image area.

5. The image processing apparatus according to claim 1, wherein
    the processing that is executed by the area processing unit is processing of replacing the image data of the matching text area or image area with image data of a predetermined mark, and
    the area adjustment unit configured to generate the one new image data by using the area replaced with the predetermined mark resulting from the processing, and using the mismatched text area or image area.

6. The image processing apparatus according to claim 5, wherein
    the area processing unit assigns a rank suffix to the predetermined marking correspondence to a rank suffix that has been assigned to the matching text area or image area in advance.

7. An image processing method employing an image reading section configured to read a document and to generate an image data and further employing a processing unit configured to perform image processing that includes:
    determining, upon acquiring a first image data for a first document and a second image data for a second document, whether a text area or an image area of the second image data matches an initial text area or an initial image area that has initially appeared in the first image data;
    executing, when the text area or image area of the second image data matches the initial text area or initial image area as a result of the determination, processing of reducing the image data of the matching text area or image area about the second image data; and generating one new image data corresponding to the second document by using the data-reduced area resulting from the processing, and using a mismatched text area or image area.

\* \* \* \* \*